United States Patent [19]

Curnutt

[11] 3,990,687

[45] Nov. 9, 1976

[54] SHOCK ABSORBER WITH CONTROLLED FLUID BYPASS MEANS

[76] Inventor: Charles R. Curnutt, 75992 Baseline, 29 Palms, Calif. 92277

[22] Filed: Feb. 5, 1976

[21] Appl. No.: 655,464

[52] U.S. Cl. .............................. 267/8 A; 188/281; 188/289; 188/322
[51] Int. Cl.² ......................................... F16F 9/342
[58] Field of Search .......... 188/289, 284, 281, 288, 188/282, 317, 322; 267/8 A, 34, 64 R

[56] References Cited
UNITED STATES PATENTS

| | | | |
|---|---|---|---|
| 1,037,052 | 8/1912 | Rennie | 188/289 |
| 1,195,028 | 8/1916 | Joyce | 188/289 |
| 1,445,414 | 2/1923 | Schuessler | 267/8 A |
| 2,671,536 | 3/1954 | Jurasevich | 188/289 |
| 3,698,284 | 10/1972 | Toering et al. | 188/289 X |

Primary Examiner—Trygve M. Blix
Assistant Examiner—Douglas C. Butler
Attorney, Agent, or Firm—Ralph B. Pastoriza

[57] ABSTRACT

The shock absorber is of the type comprising a cylinder and piston containing hydraulic fluid and wherein the piston has fluid bypass holes so that fluid can pass from one side of the piston to the other within the cylinder. Tapered pins at one end of the cylinder are receivable in the fluid bypass holes when the piston approaches the one end. A cage assembly in the form of guide rods supports the pins and passes through guide bores in the piston so that the pins and piston rotate as a unit and the pins are always held in alignment with the fluid bypass holes.

10 Claims, 8 Drawing Figures

U.S. Patent  Nov. 9, 1976  3,990,687
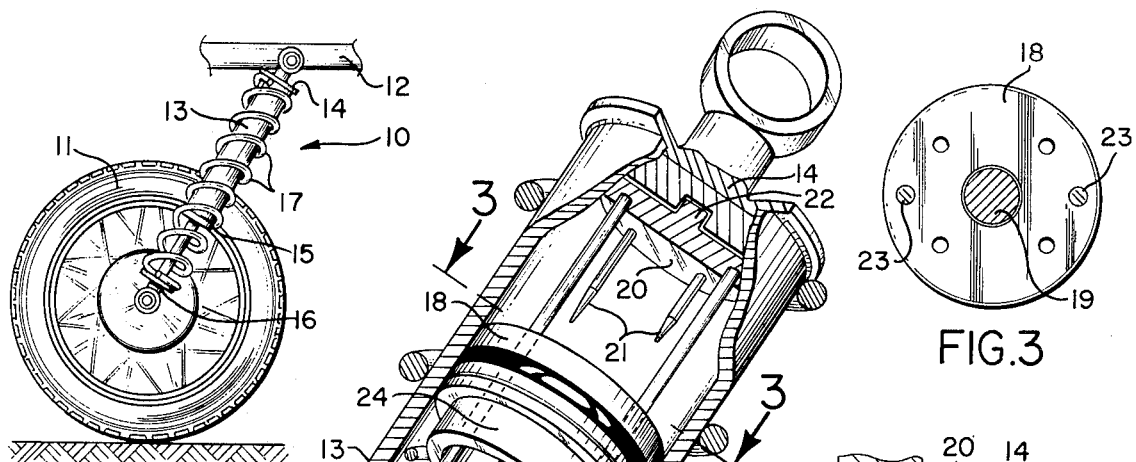
FIG.1
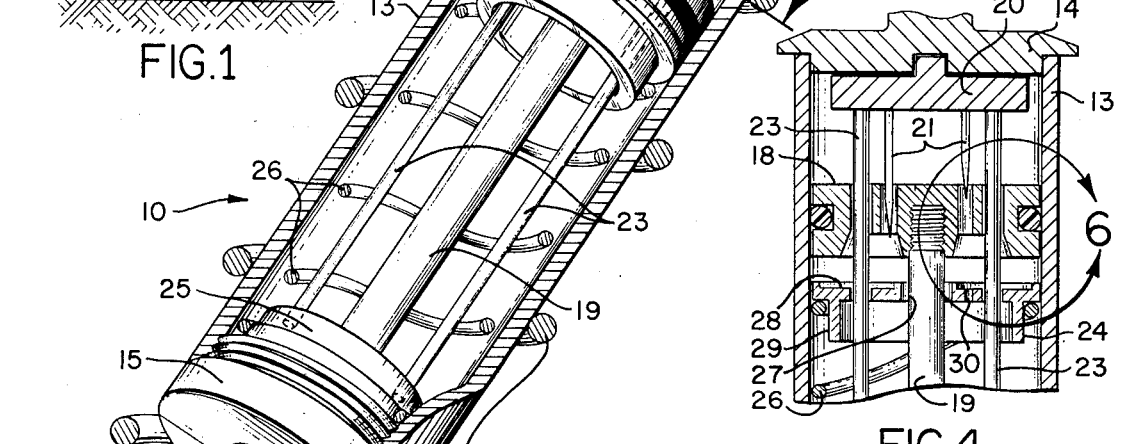
FIG.2
FIG.3
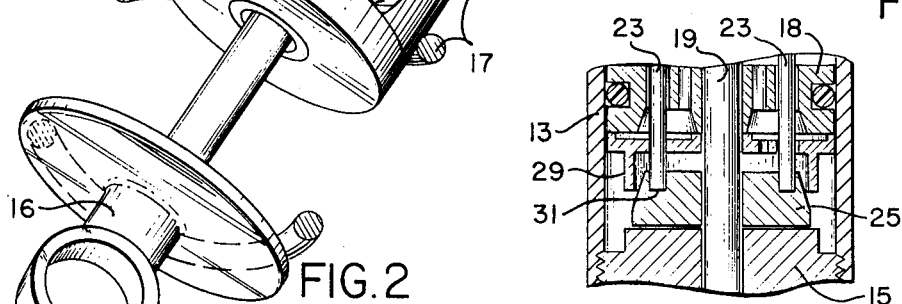
FIG.4
FIG.5
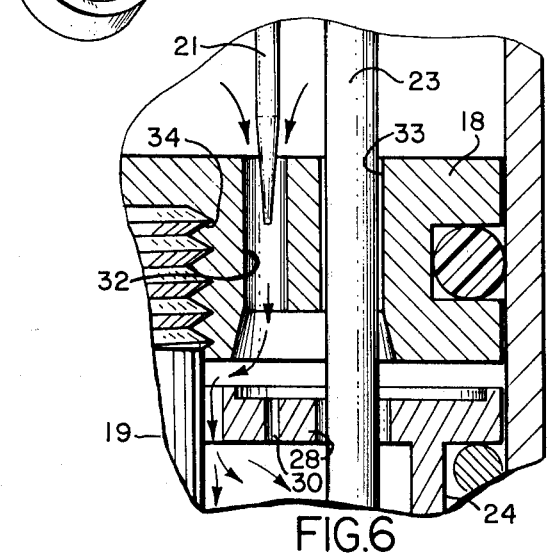
FIG.6
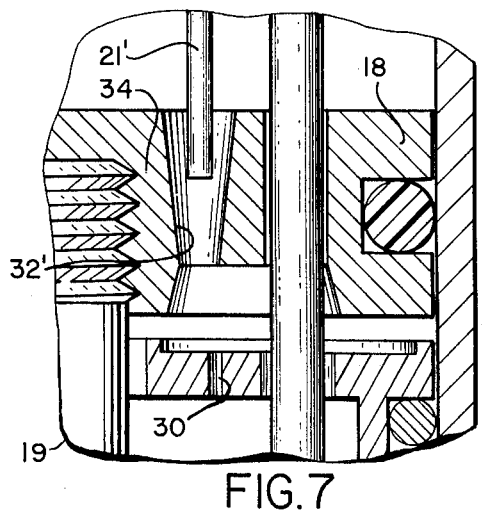
FIG.7
FIG.8

SHOCK ABSORBER WITH CONTROLLED FLUID BYPASS MEANS

This invention relates generally to shock absorbers and more particularly, to specially designed shock absorbers for use with racing motorcycles.

BACKGROUND OF THE INVENTION

In general, shock absorbers of the type under consideration comprise a cylinder incorporating a hydraulic fluid and a piston head coupled to a piston rod extending from an end of the cylinder and reciprocable within the cylinder. A powerful compression spring surrounds the casing between the closed end of the cylinder and the extending end portion of the piston rod to bias the piston rod to its fully retracted position from the cylinder. When this assembly is coupled between the wheel of a motorcycle and the motorcycle frame, bumps and the like will urge the piston rod and piston towards the closed end of the cylinder, the hydraulic fluid passing from one side of the piston head to the other through small fluid bypass openings, thereby cushioning the shock. The exterior compression spring returns the piston head to the opposite end of the cylinder from which the piston rod extends.

In order to provide a controlled cushioning of the piston as it approaches the closed end of the cylinder, small pins are provided at the closed end which receive the fluid bypass holes in the piston head as it approaches the closed end thus effectively decreasing the cross sectional area of the fluid bypass openings so that the piston head experiences a greater hydraulic resistance and thus is more cushioned as it approaches the end of its travel.

In the foregoing type of design incorporating pins, a major problem is that of assuring that the pins are received in the fluid bypass holes when the piston approaches the closed end. Any rotation of the piston head, and/or piston rod relative to the pins which are normally secured to the closed end of the casing will result in misalignment and prevent the pins from entering the fluid bypass holes.

Shock abosrbers of the type under consideration also usually include a check valve which is spring loaded against the one side of the piston head facing away from the closed end to cover the outlets of the fluid bypass holes in the piston head. When subjected to shocks or movements, the fluid passing through the fluid bypass holes will force the check valve open. Thus, more refined hydraulic control can be realized by proper designing of the strength of the check valve spring. In addition, the check valve head itself may contain a small bleeder hole to permit movement of the valve head. However, there has been experienced difficulty in the reliability of the check valves themselves. In this respect, a desirable feature would be to be able to control the degree of pressure necessary to open the check valve as a function of its position along the cylinder.

Further desirable features would be to provide means for "fine tuning" of the dynamics of motion of the piston head through the hydraulic fluid in the cylinder.

BRIEF DESCRIPTION OF THE PRESENT INVENTION

With the foregoing considerations in mind, the present invention contemplates certain improvements in shock absorbers of the type under consideration wherein the foregoing problems characteristic of many conventional shock absorbers are overcome.

More particularly, the invention includes among other features a unique mounting means for supporting extending pins and one end of the shock absorber cylinder positioned to be received in fluid bypass holes in the piston head reciprocable in the cylinder. Guide means couple the mounting means to the piston head to lock the mounting means and piston heads against relative rotation when the piston head is moving towards and away from the pins. As a consequence, the pins are always held in exact alignment with the fluid bypass holes.

The guide means itself in the preferred embodiment takes the form of guide rods rigidly secured to the mounting means which constitutes a rotatable member, the guide rods extending parallel to and on either side of the axis of the cylinder, the piston head having guide bores receiving the guide rods so as to be longitudinally movable therealong.

A guide rod retaining disc in turn secures the far ends of the guide rods at the opposite end of the cylinder so as to hold them in parallel relationship. The check valve head itself is slidable along the same guide rods to a position covering the outlets of the fluid bypass holes in the piston head. The overall length of the check valve spring and the design of the check valve provides desirable hydraulic control features not available in prior art shock absorbers.

BRIEF DESCRIPTION OF THE DRAWINGS

A better understanding of this invention as well as further features and advantages thereof will be had by now referring to the accompanying drawings in which:

FIG. 1 is a fragmentary side elevational view of the shock absorber of this invention shown positioned between a motorcycle wheel and frame portion;

FIG. 2 is an enlarged cut-away perspective view of the shock absorber of FIG. 1;

FIG. 3 is a plan view of the piston head of the shock absorber in FIG. 2 looking in the direction of the arrows 3—3;

FIG. 4 is a fragmentary cross section of the upper or closed end of the shock absorber of FIG. 2;

FIG. 5 is a fragmentary cross section of the lower portion of the shock absorber of FIG. 2;

FIG. 6 is a greatly enlarged fragmentary cross section of that portion of FIG. 4 enclosed within the circular arrow 6;

FIG. 7 is a view similar to FIG. 6 but illustrating a modification of certain components; and, FIG. 8 is a fragmentary view of a modified type of guide rod which may be used in the shock absorber of FIG. 2.

DETAILED DESCRIPTION OF THE PREFERRED EMBODIMENT

Referring first to FIG. 1, the shock absorber is designated generally by the numeral 10 positioned between a wheel 11 and frame 12 of a vehicle. As mentioned heretofore, the preferred application for the shock absorber is in racing motorcycles and FIG. 1 is illustrative of such an application.

As shown, the shock absorber includes a cylindrical casing 13 having first closed end 14 and a second open end for receiving hydraulic fluid which is normally closed by a threaded end cap 15. A piston rod connected to a piston head within the cylindrical casing 13 protrudes centrally through the end cap 15, its far extending end 16 being coupled to the vehicle wheel 11. The assembly is completed by the provision of an external spring 17 surrounding the casing between the front closed end and the extending end of the piston rod from the end cap to bias the piston head in the cylinder away from the closed end; that is, to bias the piston rod to its furthest extent from the cylinder.

Referring now to FIG. 2, further details of the shock absorber will be evident. As shown, there is provided a piston head 18 reciprocally movable in the casing towards and away from the closed end 14. A piston rod 19 is rigidly secured to the piston head and extends centrally through the threaded end cap 15 to the exterior of the casing as described.

In accordance with a first important feature of this invention, there is provided a rotatable member 20 at the inner closed end 14 of the cylindrical casing serving to support pin means in the form of a plurality of pins 21 secured to and extending from the rotatable member towards the piston head 18. As will become clearer as the description proceeds, the piston head includes fluid bypass hole means in the form of a plurality of small holes passing from one side of the piston head to the other and positioned to receive the pins 21 as the piston head approaches the closed end 14 of the cylindrical casing. The pins entering the small fluid bypass holes effectively decrease the cross section of the holes and thus offer greater resistance to hydraulic fluid in passing through these holes from one side of the piston head to the other and thus serves to greater cushion the movement of the piston head as it approaches the closed end 14. It will be noted in FIG. 2 that the rotatable member 20 and pin means 21 are supported against the closed end 14 by a bearing 22 so that the pins and member are free to rotate about the axis of the cylindrical casing.

Guide rod means in the form of a pair of guide rods 23 are secured to the rotatable member 20 and extend along the interior of the casing passing through appropriate guide bore means in the piston head 18 to terminate adjacent to the end cap 15. It will be appreciated that the guide rods 23 thus lock the piston head 18 against rotation relative to the rotatable member 20 so that the pins 21 will always be in alignment with the fluid bypass holes in the piston head 18.

Also illustrated in FIG. 2 is a check valve assembly including an annular check valve head 24 slidable along the guide rods 23 between the piston head and end cap 15. Resting in bearing engagement on the inner face of the end cap 15 is a guide rod retainer disc 25 which receives the ends of the guide rods 23 and secures them in parallel relationship. A compression spring 26 extends between the end cap 15 and the check valve head 24 so that the valve head 24 is biased to cover the side of the piston head 18 facing the end cap 15. The piston rod 19 passes through central openings in the guide rod retainer disc 25 and check valve head 24 to terminate within the piston head 18 in a secure threaded connection to the piston head. Thus, the retainer disc 25, valve head 24, piston head 18, rod 19 and rotatable member 20 are tied together by the guide rods 23 so as to rotate as a unit, the valve head 24 and piston head 18 further being longitudinally slidable along the guide rods independently of each other.

In the plan view of FIG. 3 showing the face of the piston head 18 in opposition to the pins 21, the fluid bypass bores are shown at 32 and are four in number although a different number and positioning of the guide bores could be provided, the pins assuming corresponding numbers and positions. Also shown in FIG. 3 are the guide rods 23 passing through the guide bores in the piston head 18.

In the fragmentary cross section of FIG. 4, the cooperation of the pins 21 with the fluid bypass bores in the piston head 18 will become clearer. As shown, the pins 21 are of different length such that they will progressively enter the corresponding fluid bypass holes. There is thus a successive diminution in the cross sections of the holes permitting hydraulic fluid to pass from one side of the piston head 18 to the other.

Also shown in FIG. 4 is the annular check valve head 24 illustrated slightly spaced from the underside of the piston head 18. The central opening of this check valve head 24 for receiving the piston rod 19 is shown at 27. Further, the valve head includes a recessed floor area 28, an annular wall 29 extending downwardly from the opposite side of this area. This floor area further includes an off-center opening 30 for fluid passage when the valve head 24 covers the outlet of the fluid bypass holes and the piston is returning. The recessed floor area 28 provides passage means for return of fluid to the holes when the piston returns.

The annular wall 29 serves two functions. First, it retains the upper end of the check valve compression spring 26 as shown in FIG. 4 and also defines a smooth inner wall surface of an inside diameter slightly greater than the external diameter of the spring retainer disc 25 described in FIG. 2. The arrangement is such that when the piston head 18 is retracted to its fullest extent towards the end cap 15, the guide rod retainer disc 25 will be received within the confines of the annular wall 24 thus tending to compress fluid therein so that a shock absorbing cushioning effect is provided for the piston head.

The fragmentary cross section of FIG. 5 illustrating the lower portion of the casing of FIG. 2 illustrates the foregoing effect wherein the piston head 18 and check valve head 24 are shown in their positions when the piston rod is fully retracted or pulled from the casing 18. In FIG. 5, it will be noted that the guide rod retainer disc 25 is partially received within the annular wall 29 of the check valve head 24. Also, the securement of the guide rods 23 to the guide rod retainer disc 25 is shown at 31. Because the inside diameter of the annular wall 29 is slightly greater than the external diameter of the guide rod retainer disc 25, some fluid can escape but a substantial cushioning effect is nevertheless provided.

Referring now to FIG. 6 there is shown in greatly enlarged form the action of one of the pins 21 entering one of the fluid bypass holes 32 in the piston head 18 when the piston approaches the closed end of the cylindrical casing; that is, when a sudden road shock will urge the piston rod and piston into the cylinder. While providing pins of different lengths will result in a successive diminution of the various cross sectional areas of the fluid bypass bores, a more continuous type of gradual decrease can be realized by tapering the pins such as shown for the pin 21 in FIG. 6. When so tapered, the greater their degree of entry into the fluid bypass hole, the less will be the effective cross-sectional area for bypassing fluid. The flow of fluid is indicated by the arrows in FIG. 6 and it will be noted that this fluid is passed along the recessed floor area 28 of the check valve head 24 to pass around the piston rod 19.

It will be understood that the flow of fluid through the fluid bypass openings will normally lift the check valve head 24 from the outlet side of the piston head 18. If a large shock is encountered the valve head will be further removed from the head and its rate of return through the fluid will be determined by the strength of the check valve head compression spring 26. Also, the size of the central hole through which rod 19 passes will determine the hydrodynamic character of the check valve head. The guide bore 33 in the piston head 18 for the guide rod 23 is clearly shown in FIG. 6 and some fluid flow can take place through this guide bore by making the internal diameter thereof slightly larger than the external diameter of the guide rod 23.

To the left of FIG. 6 is shown the securement of the piston rod 19 to the piston head 18 in the form of thread 34.

Referring now to FIG. 7 there is shown a modified arrangement for providing a gradual decrease in the cross sectional area of the fluid bypass holes when the piston head approaches the closed end of the cylindrical casing. In FIG. 6, this gradual decrease in cross sectional area is accomplished by tapering the fluid bypass holes such as indicated at 32' and employing uniform diameter pins such as indicated at 21'.

FIG. 8 illustrates an additional means of controlling the dynamics of movement of the piston head along the length of the cylindrical casing. In this modification, each of the guide rods, such as the guide rod 23 is modifed to have a varying diameter as indicated at 23'. This varying diameter will effectively increase and/or decrease the annular space between the exterior of the guide rod and the interior of the guide rod bore permitting the bypassing of fluid therearound. The hydraulic resistance to piston movement at various intermediate positions within the cylindrical casing can thus be controlled in accord with any desirable function within certain limits.

As already mentioned, the check valve head will move away from the piston head under normal movement of the piston; that is, under even minor shocks. The return rate is determined by the strength of the compression spring as well as the shape of the valve head. Further, since the check valve head 24 can slide along the guide rods 23 independently of the piston head 18, its mass may be selected to provide desirable inertia effects so that the return rate or response time of movement of the valve head also can be controlled in this manner.

OPERATION

The operation of the improved shock absorber of this invention will be evident from the foregoing description. With the shock absorber connected between a vehicle wheel and the vehicle frame as illustrated in FIG. 1, and with hydraulic fluid within the cylindrical casing, in the absence of any shocks applied to the absorber; that is, when the vehicle is travelling along an idealized smooth road, the piston rod and piston head will normally be retracted from the cylindrical casing by the external spring 17 to a point where the weight of the vehicle is balanced by this spring. The piston head will have an intermediate position within the cylindrical casing under these conditions. If a bump or depression is encountered by the wheel, the wheel will follow the bump or depression resulting in an upward or downward movement of the piston within the cylindrical casing as oriented in the drawings. This "shock" is thus cushioned by bypassing of the hydraulic fluid from one side of the piston to the other so that it is not transmitted to the vehicle frame.

In the event the bump is of such magnitude as to force the piston rod and piston head all the way into the cylindrical casing, the hydraulic resistance to movement will be increased as the piston head approaches the closed end as a consequence of the pins being received in the fluid bypass openings causing a gradual close-off. On the other hand, if a large cavity or depression is encountered such that the external compression spring 17 fully extends the piston rod from the casing so that the piston head might otherwise be suddenly stopped by the end cap of the cylindrical casing, such action is prevented by the "dash pot" arrangement of the spring retainer disc 15 and annular wall 29 of the check valve head 24 as described in conjunction with FIG. 5.

For intermediate shocks, the piston head will simply reciprocate within the cylindrical casing, the degree of hydraulic resistance being controlled by the various parameters as described herein. Shallow but sudden intermediate shocks will result in an added movement of the check valve head away from the piston to result in a further delay before the piston head is covered by the valve head.

Most importantly, it will be appreciated that the guide rod arrangement as described will assure that the pins are always in alignment with the fluid bypass bores. Thus, one of the major problems encountered with prior art shock absorbers is solved by the construction of the present invention.

What is claimed is:
1. A shock absorber comprising, in combination:
 a. a cylindrical casing having a first closed end and a second open end for receiving hydraulic fluid;
 b. an end cap threadedly receivable on said second open end;
 c. a piston head reciprocably movable in said casing towards and away from said first closed end;
 d. a piston rod secured to said piston head and extending centrally through said threaded end cap to the exterior of the casing;
 e. an external spring surrounding said casing between said first closed end and the extending end of said piston rod from said end cap to bias said piston away from said first closed end;
 f. a rotatable member in said casing at said first closed end;
 g. pin means secured to and extending from said rotatable member towards said piston head, said piston head having fluid bypass hole means passing from one side to the other positioned to receive said pin means as said head approaches said first closed end; and
 h. guide rod means secured to said rotatable member and extending along the interior of said casing to terminate adjacent to said end cap, said piston head having guide bore means through which said guide rod means pass such that said piston head and rotatable member are locked against relative rotation with respect to each other by said guide rod means whereby said pin means are held in alignment with said fluid bypass hole means in said piston head.

2. A shock absorber according to claim 1, in which said pin means comprise a plurality of pins each tapering to a smaller diameter towards its end, said fluid bypass hole means comprising a plurality of holes in alignment with said plurality of pins respectively whereby the effective cross section in the holes for fluid passage is gradually diminished after the ends of the pins are received therein and said piston head continues to move towards said closed end.

3. A shock absorber according to claim 1, in which said pin means comprise a plurality of pins, said fluid bypass hole means comprising a plurality of holes in alignment with said plurality of pins, the inside diameters of said holes tapering towards smaller dimensions in the direction from the point the pins enter the holes to the other side of the piston head facing said end cap whereby the effective cross section of the holes for fluid passage is gradually diminished after the ends of the pins are received therein and said piston head continues to move towards said closed end.

4. A shock absorber according to claim 1, in which said pin means comprises a plurality of pins, said fluid bypass hole means comprising a plurality of holes in alignment with said plurality of pins respectively, the lengths of said pins extending from said rotatable member being different from each other so that the effective cross sections of the holes are successively changed after the end of the longest pin is received in its aligned hole and said piston head continues to move towards said closed end.

5. A shock absorber according to claim 1, in which said guide rod means comprise at least two parallel guide rods, at least one of which changes in diameter along its length whereby a controlled hydraulic resistance to movement of said piston head back and forth in said casing along said guide rods can be effected.

6. A shock absorber according to claim 1, including an annular check valve head slidable along said guide rod means between said piston head and end cap; a guide rod retainer disc receiving the end of said guide rod means and having a central opening through which said piston rod can move, said guide rod retainer disc being positioned between said check valve head and end cap; and a compression spring between said check valve head and end cap biasing said check valve head into a position covering the outlet of said fluid bypass hole means in said other side of said piston head facing said end cap.

7. A shock absorber according to claim 6, in which said retainer disc has an outside diameter slightly less than the inside diameter of said annular check valve head such that when said piston head is retracted back towards said end cap, said annular check valve head will receive said disc and hydraulically cushion final movement of the piston head towards said end cap.

8. A shock absorber according to claim 6, in which said annular check valve head has a central opening through which said piston rod passes and through which hydraulic fluid can pass and an off-center opening for fluid flow when the valve head and piston are returning.

9. A shock absorber according to claim 8, in which the shape of said valve head is designed and the mass of the valve head selected to provide a desired inertia of movement for controlling the movement of said valve head along said guide rod means.

10. A shock absorber according to claim 6, in which said closed end and rotatable member are in bearing engagement and said guide rod retainer disc and end cap are in bearing engagement so that said piston head, piston rod, rotatable member, guide rod means and guide rod retainer disc can all rotate as a unit relative to said cylindrical casing.

* * * * *